US008844038B2

United States Patent
Niemelä

(10) Patent No.: US 8,844,038 B2
(45) Date of Patent: Sep. 23, 2014

(54) MALWARE DETECTION

(75) Inventor: Jarno Niemelä, Espoo (FI)

(73) Assignee: F-Secure Oyj, Helsinki (FI)

( * ) Notice: Subject to any disclaimer, the term of this patent is extended or adjusted under 35 U.S.C. 154(b) by 1030 days.

(21) Appl. No.: 12/459,966

(22) Filed: Jul. 9, 2009

(65) Prior Publication Data

US 2010/0011029 A1 Jan. 14, 2010

(30) Foreign Application Priority Data

Jul. 14, 2008 (GB) .................................. 0812814.2

(51) Int. Cl.
*H04L 29/06* (2006.01)
*G06F 21/55* (2013.01)
*G06F 21/56* (2013.01)
*H04W 24/08* (2009.01)

(52) U.S. Cl.
CPC .............. *H04L 63/145* (2013.01); *G06F 21/55* (2013.01); *H04W 24/08* (2013.01); *G06F 21/566* (2013.01)
USPC ................. 726/24; 726/26; 713/188; 713/187

(58) Field of Classification Search
CPC ...... H04L 63/145; G06F 21/55; G06F 21/566
USPC .......................................................... 726/24
See application file for complete search history.

(56) References Cited

U.S. PATENT DOCUMENTS

| | | | |
|---|---|---|---|
| 7,290,282 B1 * | 10/2007 | Renert et al. ..................... 726/24 |
| 7,756,535 B1 * | 7/2010 | Diao et al. ..................... 455/466 |
| 7,865,420 B1 * | 1/2011 | Daman et al. ..................... 705/37 |
| 2002/0138753 A1 | 9/2002 | Munson ......................... 713/200 |
| 2003/0200462 A1 | 10/2003 | Munson ......................... 713/200 |
| 2004/0172551 A1 * | 9/2004 | Fielding et al. ................ 713/200 |
| 2005/0240756 A1 * | 10/2005 | Mayer ................................ 713/2 |
| 2006/0037077 A1 | 2/2006 | Gadde et al. ..................... 726/23 |
| 2007/0094725 A1 * | 4/2007 | Borders ............................ 726/22 |
| 2007/0180528 A1 * | 8/2007 | Kane ................................ 726/24 |
| 2008/0034425 A1 | 2/2008 | Overcash et al. ................ 726/22 |
| 2008/0102799 A1 * | 5/2008 | Dholakia et al. ............ 455/412.1 |
| 2008/0148407 A1 * | 6/2008 | Katkar ............................. 726/24 |
| 2008/0301051 A1 * | 12/2008 | Stahlberg ......................... 705/44 |
| 2009/0125755 A1 * | 5/2009 | Herscovitz et al. ............. 714/15 |
| 2009/0240738 A1 * | 9/2009 | Fujita et al. ................... 707/200 |
| 2010/0015926 A1 * | 1/2010 | Luff ........................... 455/67.13 |

FOREIGN PATENT DOCUMENTS

WO WO 02/061510 A2 8/2002

* cited by examiner

*Primary Examiner* — Mohammad L Rahman

(74) *Attorney, Agent, or Firm* — Harrington & Smith

(57) ABSTRACT

According to a first aspect of the present invention there is provided a method of detecting malware in a mobile telecommunications device 101. In the method, maintaining a database 109 of legitimate applications and their respective expected behaviors, identifying legitimate applications running on the device 101, monitoring the behavior of the device 101, comparing this monitored behavior with that expected according to the database 109 for those legitimate applications identified as running on the device 101, and analyzing deviations from the expected behavior of the device 101 to identify the potential presence of malware.

16 Claims, 2 Drawing Sheets

MALWARE DETECTION

PRIORITY STATEMENT

This application claims priority under at least 35 U.S.C. §119(a) to foreign patent application GB 0812814.2, filed on Jul. 14, 2008.

TECHNICAL FIELD

The present invention relates to malware detection, and in particular to malware detection in a mobile communication device such as a mobile phone.

BACKGROUND

Malware is short for malicious software and is used as a term to refer to any software designed to infiltrate or damage a computer system without the owner's informed consent. Malware can include computer viruses, worms, trojan horses, rootkits, adware, spyware and any other malicious and unwanted software.

When a device is infected by malware the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware.

Whilst malware has long been a problem in personal computers (PCs) it is now becoming an issue in mobile telecommunications technology. As the use of mobile telecommunications technology spreads and its applications become more diverse, security threats to mobile devices and the data they hold are becoming more common. Instances of malicious mobile phone software such as viruses and spyware are on the increase.

As an example of this, mobile phone spyware can be used to monitor or copy Short Message Service (SMS) messages and Multimedia Messaging Service (MMS) messages, email text and addresses, contact numbers and call logs including phone numbers and the time and duration of calls, and SIM card information (i.e. the SIM IMSI and phone number). This information can then be sent either to a server, from where it can be retrieved, or directly to another mobile device. In addition, mobile phone spyware can be used to record key presses, record incoming and outgoing voice conversations, intercept calls, track the users location using either built-in GPS devices or the GSM cell ID and signal information, and even for remote listening without the user's knowledge.

Detecting malware is challenging as the malware authors design their software to be difficult to detect, often employing technology that deliberately hides the presence of malware on a system, i.e. the malware application may not show up on the operating system tables that list currently running processes.

PCs make use of anti-virus software to detect and possibly remove malware. In order to detect a malware program the anti-virus software must have some way of identifying it amongst all the other files present on a PC. Typically, this requires that the anti-virus software has a database containing the "signatures" or fingerprints that are characteristic of individual malware programs. When the supplier of the anti-virus software identifies a new malware threat, the threat is analyzed and its signature is extracted. The malware is then "known" and its signature can be supplied as updates to the anti-virus software database. Using this approach, it is not possible to detect the presence of "unknown" malware programs that have not yet been analyzed for their signature, such that the database of signatures requires regular updates to ensure that the software can identify as many threats as possible.

To address this issue, in addition to scanning for malware signatures, most anti-virus applications additionally employ heuristic analysis. This approach involves the application of general rules intended to distinguish the behaviour of any malware from that of legitimate applications. For example, the behaviour of all programs on a PC is monitored and if a program attempts to write data to an executable program, the anti-virus software can flag this as suspicious behaviour.

SUMMARY

It may be possible to implement heuristic rules to detect behaviour that deviates from the behaviour to be expected from applications running on a device. However, such an approach is difficult to implement in PCs where there are many varied potential applications and where a large number of these applications can be running in parallel. However, in mobile telecommunications devices such as mobile phones, the relatively small number of legitimate applications makes it realistic to analyze most, if not all of these programs to determine their behaviour. Details of this expected behaviour can then be maintained in a database and used for comparison with the monitored behaviour of a mobile device to identify the possible presence of malware.

According to a first aspect of the present invention there is provided a method of detecting malware in a mobile telecommunications device. The method comprises, maintaining a database of legitimate applications and their respective expected behaviours, identifying legitimate applications running on the device, monitoring the behaviour of the device, comparing this monitored behaviour with that expected according to the database for those legitimate applications identified as running on the device, and analyzing deviations from the expected behaviour of the device to identify the potential presence of malware.

The step of maintaining the database of legitimate applications may comprise periodically receiving the identities of new applications and their respective expected behaviours and adding these to the database.

The step of maintaining the database of legitimate applications may comprise identifying new applications added to the device, sending a request for the expected behaviours of the new applications added to the device to a network based service provider, receiving the expected behaviours requested from the service provider, and adding the identities of the new applications and their expected behaviours to the database.

The behaviour to be monitored may comprise the sending and receiving of data traffic to or from the device via a network connection.

In the event that the step of analyzing deviations identifies that data traffic is being uploaded to a website when no web browser is running on the device, this behaviour may be taken as indicative of the presence of malware.

If the step of analyzing deviations identifies that data traffic is being uploaded to a website when a web browser is running on the device and no data has been downloaded to the device from that website, this behaviour may be taken as indicative of the presence of malware.

In the event that the step of analyzing deviations identifies that the contents of the data traffic sent from the device includes details of recent activity of the device, this behaviour may be taken as indicative of the presence of malware.

The behaviour to be monitored may comprise the sending and receiving of Short Message Service, SMS messages and Multimedia Messaging Service, MMS messages.

If the step of analyzing deviations identifies that SMS or MMS messages are sent immediately after the sending or receipt of SMS or MMS messages, this behaviour may be taken as indicative of the presence of malware.

In the event that the step of analyzing deviations identifies that SMS or MMS messages are sent during or immediately after a voice call made to or from the device, or during or immediately after the running of an application, this behaviour may be taken as indicative of the presence of malware.

If the step of analyzing deviations identifies that the contents of SMS and MMS messages sent from the device matches the contents of SMS and MMS messages previously received by or sent from the device, this behaviour may be taken as indicative of the presence of malware.

If the step of analyzing deviations identifies that the contents of SMS and MMS messages sent from the device includes details of recent activity of the device, this behaviour may be taken as indicative of the presence of malware.

According to a second aspect of the present invention there is provided a recording medium storing computer interpretable instructions for causing a programmable computer to perform a method for detecting malware in a mobile telecommunications device, the method being according to any of the steps described herein.

According to a third aspect of the present invention there is provided a mobile telecommunications device. The mobile telecommunications device comprising a memory for storing a database of legitimate applications and their respective expected behaviours, and a processor for identifying legitimate applications running on the device, accessing the memory to obtain the expected behaviours of those legitimate applications identified as running on the device, monitoring the behaviour of the device, comparing the expected behaviour with the monitored behaviour, and for analyzing deviations in the monitored behaviour from the expected behaviour to identify the potential presence of malware.

According to a fourth aspect of the present invention there is provided a method of maintaining a database of legitimate applications and their respective expected behaviours in a plurality of mobile telecommunications devices. The method comprising, at a network based service, identifying new applications for running on the devices, analyzing these new applications to determine their respective expected behaviours, and sending the identities of the new applications and their respective expected behaviours to the devices.

DETAILED DESCRIPTION

There will now be described a method of detecting malware in a mobile telecommunication device such as a mobile phone. The method involves maintaining a database identifying legitimate applications and their expected behaviour and using this as a "white list" for comparison with and analysis of the actual behaviour of the device. By comparing the monitored behaviour with that expected, any deviations from the expected behaviour can be analyzed to identify the potential presence of malware.

Whilst it is extremely difficult to implement this approach on a PC with any accuracy, as there are too many applications whose behaviour would have to be analyzed and added to the database, the relatively small number of legitimate applications that are available for mobile devices make it realistic to analyze most, if not all of these programs to determine their behaviour. Details of this expected behaviour can then be maintained in a database, with any new applications being analyzed and the details of their behaviour added. Furthermore, in contrast to the situation normally pertaining to PCs, the identification and analysis of deviations from expected behaviour is simplified in a mobile device where only a relatively small number of applications will be running at anyone time.

By way of example, the majority of the data traffic on a mobile phone typically results from web site browsing, receiving and sending email and multimedia messages, and downloading news items and other such content through RSS feeds. Furthermore, most mobile devices come with a built-in web browser, and there are very few third party web browsers available. Most users typically use the built-in web browser, as well as the built-in email and messaging tools supplied by the mobile phone vendor. Whilst third-party applications that make use of a mobile phone's network connection are available, the number of these applications is small in comparison to those available for PCs.

This makes it feasible to maintain a database of legitimate applications and their properties such as the network traffic they would cause when run on a mobile phone. Using a knowledge of the legitimate applications that are known and/or expected to be causing data traffic, it can be determined whether the actual observed traffic can be explained by these 'visible' applications and their combined data traffic. If not, this unusual traffic could be an indication of the presence of malware and particularly spyware.

Figure 1:
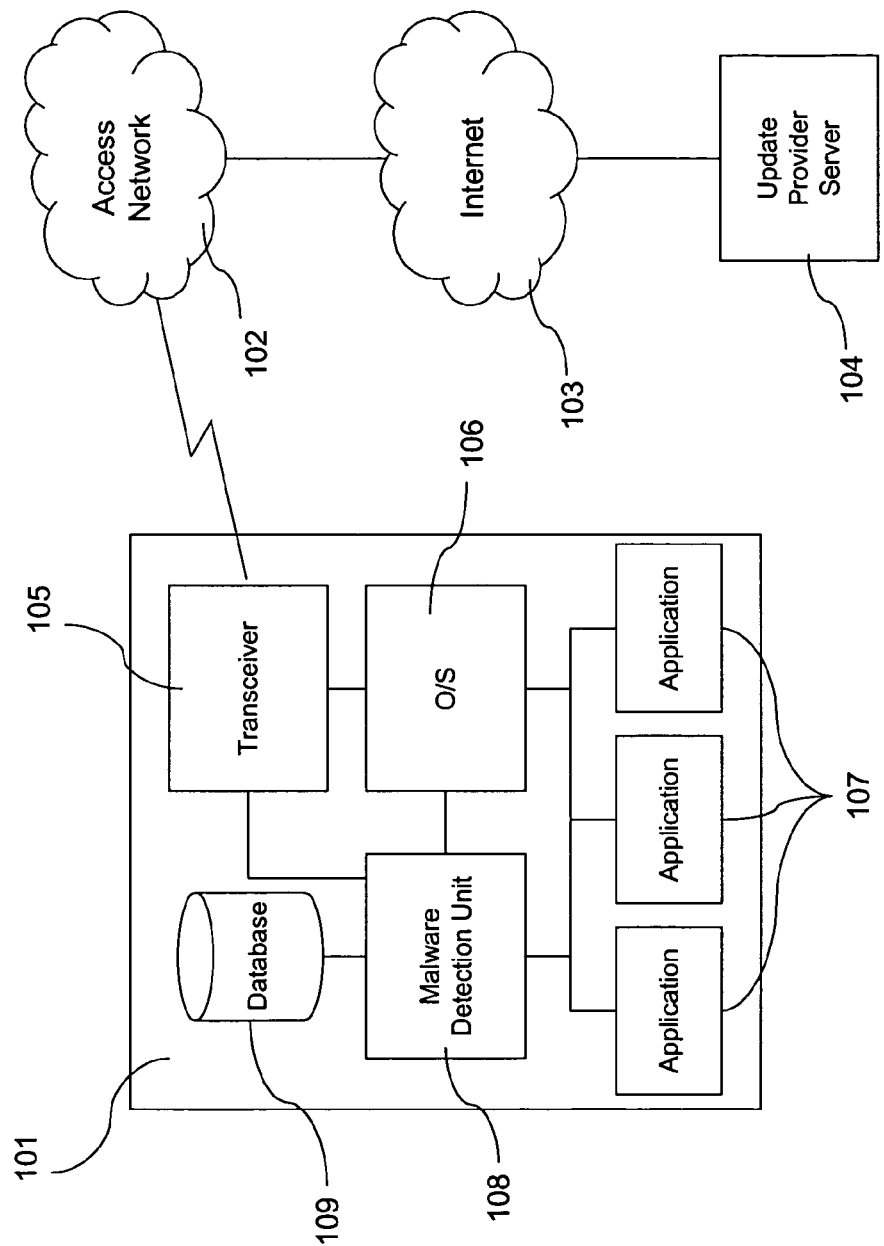
FIG. 1 illustrates schematically a mobile phone suitable for detecting spyware according to an embodiment of the present invention.

FIG. 1 illustrates schematically a system according to an embodiment of the present invention and which comprises a mobile phone 101 or similar mobile telecommunications device connected to an access network 102 (e.g. WiMax, WiLAN, 3G etc) providing access to the Internet 103. Also connected to the Internet 103 is a server 104 providing legitimate application updates.

The mobile phone 101 has a transceiver 105 for communicating using the access network 102, an operating system 106, various applications 107, a malware detection unit 108 and a database 109. The malware detection unit 108 is responsible for maintaining the database 109 of legitimate applications and their expected behaviours. The malware detection unit 108 monitors the actual behaviour of the mobile phone 101 and performs comparison and analysis of this monitored behaviour with that expected according to the database 109. In order to monitor the behaviour of the mobile phone 101 the malware detection unit 108 can interface directly with the transceiver 105 or network adapters (not shown) or can obtain information from the operating system 106 or applications 107. Alternatively, the malware detection unit 108 can monitor the behaviour using interception methods such as hardware virtualization, implementing a filter between the hardware and any software applications that access the transceiver 105.

Figure 2:
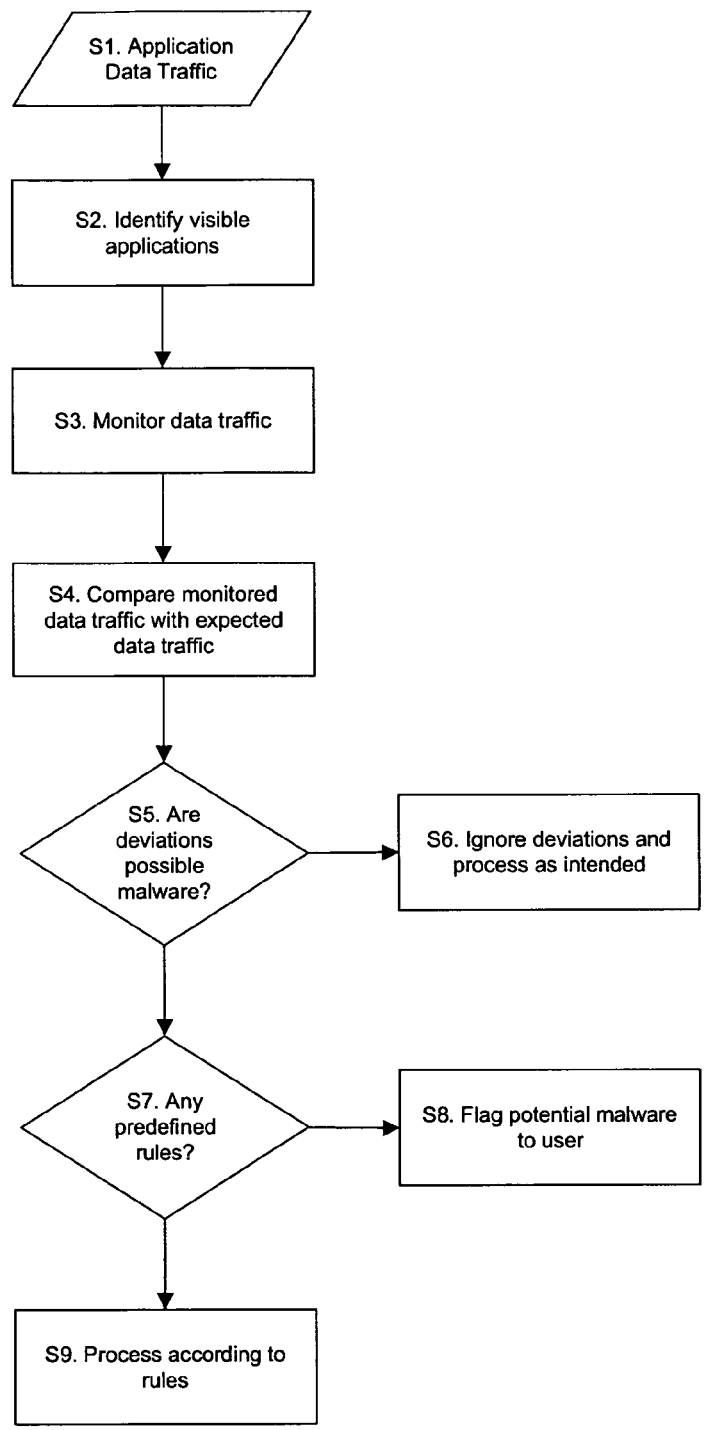
FIG. 2 is a flow diagram illustrating the process of detecting malware according to an embodiment of the present invention.

FIG. 2 is a flow diagram further illustrating the process of detecting malware by analysis of deviations in the expected behaviour of a mobile device according to an embodiment of the present invention. The steps performed are as follows:

S1. The functioning of the various applications 107 on the mobile phone 101 creates data traffic that is sent and received by the mobile phone 101 over the access network 102.

S2. The malware detection unit 108 determines which visible applications 106 are running on the mobile phone 101.

S3. The malware detection unit 108 is aware of the data traffic (S1) and can determine details of this traffic. For example, these details can include which port numbers and protocols are being used, how much data is being transferred, and the timing and size of data packets sent in each direction.

S4. The malware detection unit 108 compares the monitored data traffic with the behaviour expected according to the database 109, for those legitimate applications 107 identified as running on the mobile phone 101.

S5. Any deviations in the expected data traffic are then analyzed by the malware detection unit 108 to determine if any of these deviations could potentially be due to the activity of malware.

S6. If the analysis determines that a deviation is not likely to be due to the activity of malware (e.g. the deviation is relatively insignificant) then it is ignored and the data is processed as intended.

S7. If the analysis determines that a deviation is likely to be due to the activity of malware then the malware detection unit 108 will check if there are any predefined rules, in the form of a user-definable profile or centrally administered policy, for handling such suspicious activity.

S8. If there are no predefined rules, the malware detection unit 108 prompts the user to select whether the suspicious traffic should be allowed.

S9. If there are some predefined rules then the malware detection unit 108 will take action based on the applicable rules.

The database 109 used by the malware detection unit 108 is likely to need updating with details of additional legitimate applications that may be added to the phone. These updates can be provided in the form of uploads from a web server 104 accessed over the Internet 103 and operated by the provider of the spyware detection software or possibly by the manufacturer of the mobile phone or the network operator. Updates may also be provided in the form of a memory card or other storage device that can be accessed by a reader that is part of or is connected to the mobile phone. Alternatively, updates could be sent to the phone using SMS or MMS messages.

The database 109 may receive and maintain data for all known applications, or may only maintain data for those applications installed in the device or available to that device. The device may signal its requirements to the server 104 and receive only the relevant updates. In either case, updates should be secured such that malicious software cannot 'falsify' a record that would identify it as a legitimate application and prevent its detection.

In a simple scenario, the malware detection unit 108 may be aware that there is network traffic, yet there is no legitimate application running on the device. Such behaviour would indicate the presence of an unidentified application that could well be malware. If there is a single legitimate application running on the mobile phone and creating network traffic, such as the web browser or a third-party RSS feed reader, then the expected traffic of the running application can be compared against the monitored traffic. If any part of that network traffic does not seem likely to have come from the running application, this would also indicate the presence of an unidentified application and should be flagged as suspicious. If there are several legitimate network applications running at the same time, then the network traffic pattern is analyzed to determine if any deviations in the expected data traffic could be the result of malware.

A further example of detecting malware by analyzing deviations in the expected behaviour of a mobile device involves specifically monitoring data being uploaded from the mobile device to the network (such as HTTP POST method). Once again, if data upload traffic is being sent and yet there is no active web browser, then the data traffic could be flagged as suspicious. Furthermore, it would be expected that data would only be uploaded to a destination from which a web page had previously been downloaded. Therefore, if there is an active web browser but no pages have been downloaded from the server to which the data upload is directed, this could also be flagged as suspicious. Additionally, the contents of data uploads sent from the phone could be monitored to determine if they match any relevant data, such as SMS or MMS messages recently sent or received by the phone, or even the details of recent phone calls (e.g. caller/callee phone numbers and call duration etc), as this could indicate the presence of spyware uploading information regarding the activity of the mobile phone.

A yet further example of detecting malware by analyzing deviations in the expected behaviour of a mobile device involves monitoring incoming and outgoing SMS and/or MMS messages. If an outgoing SMS or MMS message leaves immediately after an incoming or outgoing message, this could be an indication of the presence of spyware monitoring messaging activity. The immediacy and frequency at which such messages are sent could be a further indication of the suspicious nature of such behaviour. Similarly, it could be an indication of the presence of spyware if an SMS or MMS message is sent immediately after every phone call and/or immediately after an application has been terminated or while the call and/or application are still active.

The embodiments described above can comprise processes performed in a mobile phone or other wireless telecommunications device or at a node of a telecommunications network acting as a "proxy" on behalf of the phone or other device. Programs implementing these processes may be stored on any carrier capable of carrying the program, e.g. memory card, ROM, or hard disk drive. The program may also be transmissible using an electrical or optical signal that may be conveyed via electrical or optical cable or by radio or other means.

It will be appreciated by the person of skill in the art that various modifications may be made to the above described embodiments without departing from the scope of the present invention.

The invention claimed is:

1. A method of detecting malware in a mobile telecommunications device, the method comprising:
   maintaining a database of legitimate applications and respective expected behaviours of the legitimate applications;
   identifying legitimate applications running on the device;
   monitoring behaviour of the device, the monitored behaviour comprising the sending and receiving of data traffic via a network connection,
   comparing the monitored behaviour with expected behaviours of the device according to the database for the legitimate applications identified as running on the device;

analysing deviations from the expected behaviours of the device to identify potential presence of malware; and in the event that analyzing deviations identifies data traffic is being uploaded to a website when no web browser is running on the device, identifying the upload of the data traffic to the website as indicative of the presence of malware.

2. A method as claimed in claim 1, wherein the step of maintaining the database of legitimate applications comprises:

periodically receiving identities of new applications and respective expected behaviours of the new applications and adding the new applications and the respective expected behaviours of the new applications to the database.

3. A method as claimed in claim 1, wherein the step of maintaining the database of legitimate applications comprises:

identifying new applications added to the device;

sending a request for the expected behaviours of the new applications added to the device to a network based service provider;

receiving the expected behaviours requested of the new applications from the service provider; and adding the identities of the new applications and the expected behaviours of the new applications to the database.

4. A method as claimed in claim 1, wherein, in the event that said step of analysing deviations identifies that data traffic is being uploaded to a website when a web browser is running on the device and no data has been downloaded to the device from the website, identifying the upload of the data traffic to the website as indicative of the presence of malware.

5. A method as claimed in claim 1, wherein, in the event that said step of analysing deviations identifies that the contents of the data traffic sent from the device includes details of recent activity of the device, identifying the sending of the data traffic as indicative of the presence of malware.

6. A method as claimed in claim 1, wherein a monitored behaviour comprises the sending and receiving of Short Message Service, SMS messages Multimedia Messaging Service, MMS messages.

7. A method as claimed in claim 6, wherein, in the event that said step of analysing deviations identifies that SMS or MMS messages are sent immediately after the sending or receipt of SMS or MMS messages, identifying the sending of SMS or MMS messages immediately after the sending or receipt of SMS or MMS messages as indicative of the presence of malware.

8. A method as claimed in claim 6, wherein, in the event that said step of analysing deviations identifies that SMS or MMS messages are sent during or immediately after a voice call made to or from the device or during or immediately after the running of an application, identifying the sending of SMS or MMS messages during or immediately after a voice call made to or from the device or during or immediately after the running of an application as indicative of the presence of malware.

9. A method as claimed in claim 6, wherein, in the event that said step of analysing deviations identifies that the contents of SMS and MMS messages sent from the device matches the contents of SMS and MMS messages previously received by or sent from the device, identifying the sending of SMS and MMS messages matching the contents of SMS and MMS message previously received by or sent from the device as indicative of the presence of malware.

10. A method as claimed in claim 6, wherein, in the event that said step of analysing deviations identifies that the contents of SMS and MMS messages sent from the device includes details of recent activity of the device, identifying the sending of SMS and MMS messages that includes the details of recent activity of the device as indicative of the presence of malware.

11. A non-transitory recording medium storing computer interpretable instructions for causing a programmable computer to perform a method for detecting malware in a mobile telecommunications device, the method being according to claim 1.

12. A mobile telecommunications device comprising:

a memory configured to store a database of legitimate applications and respective expected behaviours of the legitimate applications; and a processor configured to identify legitimate applications running on the device, configured to access the memory to obtain the expected behaviours of the legitimate applications identified as running on the device, configured to monitor behaviour of the device, the monitored behaviour comprising the sending and receiving of data traffic via a network connection, configured to compare the expected behaviour with the monitored behaviour, configured to analyze deviations in the monitored behaviour from the expected behaviour to identify potential presence of malware, and, in the event that analyzing deviations identifies data traffic is being uploaded to a website when no web browser is running on the device, configured to identify the upload of the data traffic to the website as indicative of the presence of malware.

13. A method of maintaining a database of legitimate applications and respective expected behaviours of the legitimate applications in a plurality of mobile telecommunications devices, the method comprising:

identifying at a network based service, new applications for running on the devices;

analysing the new applications to determine respective expected behaviours of the new applications which behaviours relate to the sending and receiving of data traffic via a network connection; and sending identities of the new applications and the respective expected behaviours of the applications to the devices, wherein at least one of the devices is configured to analyze deviations in monitored behaviour from the expected behaviours, and configured so that in the event that analyzing deviations identifies data traffic is being uploaded to a website when no web browser is running on said at least one of the devices, to identify the upload of the data traffic to the website as indicative of the presence of malware.

14. A method as claimed in claim 1, wherein the expected behaviours comprise expected activity of the mobile telecommunications device caused by running of the legitimate applications, wherein the monitored behaviour comprises actual activity of the mobile telecommunications device, and wherein the step of analyzing deviations comprises analysing deviations from the expected behaviours of the device to identify potential presence of malware causing the actual activity of the mobile telecommunications device.

15. A. mobile telecommunications device according to claim 12, wherein the expected behaviours comprise expected activity of the mobile telecommunications device caused by running of the legitimate applications, wherein the monitored behaviour comprises actual activity of the mobile telecommunications device, and wherein the deviations from the expected behaviours of the device are analyzed to identify potential presence of malware causing the actual activity of the mobile telecommunications device.

16. A method according to claim 13, wherein the expected behaviours comprise expected activity of the mobile telecommunications devices caused by running of the legitimate applications on the mobile telecommunications devices.

* * * * *